March 21, 1944.  B. A. SWENNES  2,344,656
TRANSMISSION
Filed Feb. 2, 1942
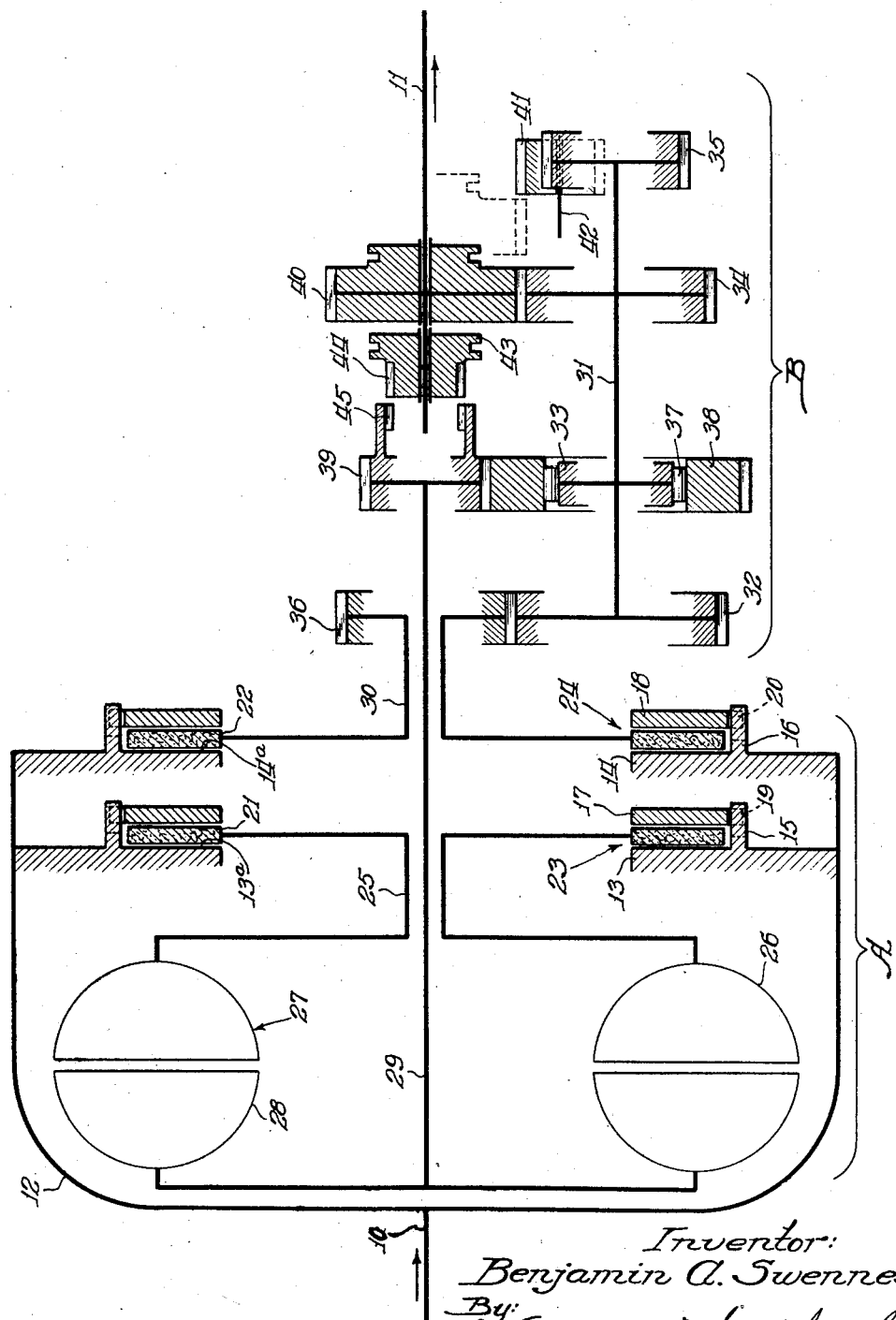
Inventor:
Benjamin A. Swennes
By:
Edward C. Fitzbaugh
Atty.

Patented Mar. 21, 1944

2,344,656

UNITED STATES PATENT OFFICE 2,344,656

TRANSMISSION

Benjamin A. Swennes, Rockford, Ill., assignor to Borg-Warner Corporation, Chicago, Ill., a corporation of Illinois Application February 2, 1942, Serial No. 429,158

5 Claims. (Cl. 74—189.5)

My invention relates to transmissions or speed changing mechanisms, and particularly to such mechanisms as are used in automotive vehicles.

It is an object of my invention to provide an improved mechanism of this type by means of which a driven shaft may be rotated with a cushioned or yielding drive at certain speed ratios with respect to a drive shaft and by means of which the driven shaft may be rotated at other speed ratios with a more positive connection between the drive and driven shafts. I contemplate in particular that such a cushioned drive between the drive and driven shafts may be provided with a hydrodynamic device such as a fluid coupling.

It is another object of my invention to provide an improved mechanism of this type by means of which the speed ratios between the drive and driven shafts may be changed with a minimum of manipulation of transmission controlling means. In particular it is an object of my invention to provide a one-way clutch in at least one power train between the drive and driven shafts whereby the one-way clutch automatically opens the power train when another power train is completed to drive the driven shaft at a higher speed ratio.

In a preferred form my invention comprises a drive shaft and a driven shaft, a fluid coupling, a clutch for connecting the driving element of the fluid coupling with the drive shaft, a clutch for connecting the driven element of the fluid coupling with the driven shaft, a low-speed set and a higher-speed set of reduction gearing with each gear set being connected to drive the driven shaft and with the low-speed gear set being connected with the driven element of the fluid coupling to complete a power path between the drive and driven shafts, a clutch for connecting the higher-speed gear set with the drive shaft, and a one-way clutch in the low-speed gear set adapted to overrun when the driven shaft is driven at a higher speed ratio.

These and other objects of the invention will become apparent from the following detailed description when considered together with the accompanying drawing in which is shown a diagrammatic illustration of a preferred form of my invention.

Referring now to the drawing, the speed changing mechanism is inserted in a power transmitting drive between a drive shaft 10 and a driven shaft 11. The transmission operates as a unit; however, for clarity in description, the transmission may be considered to comprise a hydrodynamic device and clutch unit A and a gear unit B. The unit A comprises a housing 12 which is connected with the shaft 10 to rotate therewith. The housing is provided with inwardly extending flanges 13 and 14 formed respectively with friction facings 13a and 14a and with bifurcated lugs 15 and 16. Pressure plates 17 and 18, provided respectively with outwardly extending lugs 19 and 20, are disposed opposite the friction facings 13a and 14a with the lugs 19 and 20 disposed in the bifurcated lugs 15 and 16. A clutch disc 21 is disposed between the flange 13 and the pressure plate 17, and a clutch disc 22 is disposed between the flange 14 and the pressure plate 18. By reason of the lugs 19 and 20 being disposed in the bifurcated lugs 15 and 16, the pressure plates 17 and 18 rotate with the housing 12 and shaft 10. The parts 13, 17 and 21 form a friction clutch 23, and the parts 14, 18 and 22 form a friction clutch 24. The pressure plates 17 and 18 may be moved toward and away from the friction facings 13a and 14a respectively to engage or disengage the respective clutches either automatically or manually and by any suitable means (not shown). The clutches may be operated, for example, by fluid pressure operated pistons.

The clutch disc 21 is connected by means of a hollow shaft 25 with the driving element 26 of a hydrodynamic power transmitting device 27, and a driven element 28 of the device is connected with a centrally disposed shaft 29. The clutch disc 22 is connected with a hollow shaft 30 through which the shaft 29 passes. The hydrodynamic device 27 is disposed inside and is suitably fixed relative to the housing 12. The device 27 in the illustrated embodiment of my invention is a fluid coupling of the ordinary type having a driving element and a driven element disposed in a body of fluid and so constructed that rotation of the driving element causes rotation of the driven element with a certain amount of slippage between the elements depending upon the speed of the driving element and the load on the driven element whereby the driven element is rotated with a cushioned drive.

The gear unit B comprises a countershaft 31 having a gear 32, a hub member 33 and gears 34 and 35 fixed thereon. The gear 32 is in mesh with a gear 36 which is fixed on the shaft 30. The hub member 33 is formed on its outer periphery with a plurality of cam surfaces (not shown), and a roller 37 is provided between each of these surfaces and a gear 38 which is in the form of a ring disposed coaxially with the hub member 33.

The gear 38, the hub member 33 and the rollers 37 form the ordinary type of roller or one-way clutch, and in the illustrated embodiment of my invention the roller clutch is so constructed that when the gear 38 is rotated in a reverse direction with respect to the direction of rotation of the drive shaft 10, the clutch engages and causes the hub member 33 to rotate with the gear 38. The gear 38 is in mesh with a gear 39 which is fixed to the shaft 29.

The gear 34 is adapted to mesh with the gear 40 which is slidably but non-rotatably disposed on the driven shaft 11. The gear 35 is in mesh with a gear 41 which is rotatably disposed on a shaft 42. The gear 40 is adapted to be moved on the shaft 11 into mesh with the gear 41 and when the gear 40 is in a position between the gears 34 and 41 as shown in dotted lines in the drawing, it is in neutral position and no power may be transmitted through it to the driven shaft 11.

A jaw clutch member 43 which is provided with clutch teeth 44 is slidably but non-rotatably disposed on the driven shaft 11. Clutch teeth 45 are provided on the gear 39, and these clutch teeth are adapted to mesh with the clutch teeth 44 when the member 43 is moved toward the gear 39. A direct and positive connection may be thereby completed between the shafts 29 and 11.

Low or first speed forward, second or intermediate speed forward, high speed forward, reverse and neutral are provided by the transmission. The drives in first and high speed forward and in reverse are through the fluid coupling 27, and the drives are thus cushioned. The second-speed forward drive is through the friction clutch 24, and this drive is thus more positive.

The shaft 11 may be driven at low speed forward by engaging the clutch 23 with the clutch 24 disengaged, withe the clutch teeth 44 and 45 out of mesh and with the gears 34 and 40 in mesh. The drive is then from the drive shaft 10 through the housing 12, the clutch 23, the shaft 25, the fluid coupling 27, the shaft 29, the gears 39 and 38, the rollers 37, the hub member 33, the shaft 31 and the gears 34 and 40 to the shaft 11. Since the fluid coupling 27 is in this power train, the shaft 11 is rotated with a cushioned drive and a vehicle on which the transmission is installed may be started in low gear gradually and without jerking. The speed ratio between the shafts 29 and 11 is determined by the number of teeth on the individual gears 39, 38, 34 and 40, and these gears may thus be termed the low-speed set of reduction gearing.

The shaft 11 may be driven at second speed forward by engaging the clutch 24 with the other parts of the transmission left in their relative positions as for low speed forward drive. In second speed drive, power is transmitted from the drive shaft 10 through the housing 12, the clutch 24, the shaft 30, the gears 36 and 32, the shaft 31 and the gears 34 and 40 to the driven shaft 11. The fluid coupling 27 is not in the second-speed power train, and the driven shaft 11 is more positively connected with the drive shaft 10 through friction clutch 24, with the clutch allowing little slippage between its driving and driven elements. The second-speed ratio is useful when the vehicle on which the transmission is installed is descending a steep hill, since, with the friction clutch connection between the drive and driven shafts, the motor of the vehicle acts effectively to brake the vehicle and holds it at low speed. When the shaft 11 is driven at second speed forward, there is no power transmitted through the gears 39 and 38, and the one-way clutch comprising the rollers 37, the hub member 33, and the gear 38 overruns. At this speed, the speed ratio between the shafts 10 and 11 is determined by the number of teeth on the individual gears 36, 32, 34 and 40, and these gears may thus be termed the second-speed set of reduction gearing.

The shaft 11 may be driven at high speed forward by disengaging the clutch 24 and bringing the clutch teeth 44 and 45 into mesh. The drive is then from the drive shaft 10 through the housing 12, the clutch 23, the shaft 25, the fluid coupling 27, the shaft 29, the gear 39, the clutch teeth 44 and 45 and the clutch member 43 to the shaft 11. Since the fluid coupling 27 is in the high-speed power train, the shaft 11 at this speed ratio is rotated with a cushioned drive. The one-way clutch comprising the parts 33, 37 and 38 overruns at high speed forward drive as at second speed forward drive.

The drive through the transmission between the drive and driven shafts may be broken by disengaging the clutch 23 and allowing the clutch 24 to remain in disengaged condition. This may be termed a neutral condition of the transmission. The transmission may also be brought into neutral condition by moving the gear 40 on the shaft 11 to its dotted position as shown in the drawing between and out of mesh with the gears 34 and 41 with the clutch teeth 44 and 45 disengaged. When the transmission is in this condition, either or both of the clutches 23 and 24 may be in engaged condition, yet no power can be transmitted through the transmission.

The shaft 11 may be driven in reverse by engaging the clutch 23 with the clutch 24 disengaged, with the teeth 44 and 45 out of mesh and with the gear 40 moved on the shaft 11 to mesh with the gear 41. The drive is then from the shaft 10 through the housing 12, the clutch 23, the shaft 25, the fluid coupling 27, the shaft 29, the gears 39 and 38, the rollers 37, the hub member 33, the shaft 31 and the gears 35, 41 and 40 to the shaft 11.

My improved transmission advantageously provides a cushioned drive in first speed forward whereby a vehicle on which the transmission is installed may be started gradually and without jerking, and the transmission also provides a cushioned drive in high speed forward which is the speed ratio generally used in driving. The transmission provides a more positive drive in second speed forward whereby the engine of the vehicle may be used effectively as a brake to hold the vehicle at low speed when descending steep hills. By virtue of the free-wheeling clutch comprising the parts 33, 37 and 38, in order to change the speed ratio from low speed forward to second speed forward, it is only necessary to engage the clutch 24 without disengaging the clutch 23 or manipulating any other controlling means.

I wish it to be understood that my invention is not to be limited to the specific construction shown and described except only insofar as the claims may be so limited as it will be apparent to those skilled in the art that changes in the construction may be made without departing from the principles of my invention.

I claim:

1. In a transmission, the combination of a drive shaft, a driven shaft, a hydrodynamic power transmitting device adapted to be driven by said drive shaft, means for releasably connecting directly said driven shaft with the driven element of said hydrodynamic device, a set of reduction gearing, a clutch for connecting said driven shaft with said drive shaft through said reduction gearing, and means for connecting said driven shaft with the driven element of said hydrodynamic device and including a second set of reduction gearing and a one-way clutch adapted to overrun when said first-named connecting means is operative.

2. In a transmission, the combination of a drive shaft, a driven shaft, a hydrodynamic power transmitting device adapted to be driven by said drive shaft, a low-speed set of reduction gearing for driving said driven shaft and connected with the driven element of said hydrodynamic device and including a one-way clutch, a higher speed set of reduction gearing, a clutch for completing a power train between said shafts including said last-named gear set connected with said drive shaft, and a clutch for connecting said driven shaft with the driven element of said hydrodynamic device.

3. In a transmission, the combination of a drive shaft, a driven shaft, a fluid coupling adapted to be driven by said drive shaft, a low-speed set and a higher-speed set of reduction gearing each connected for driving said driven shaft, said low-speed set of reduction gearing including a one-way clutch and being connected with the driven element of said fluid coupling, a clutch for connecting said higher-speed set of gearing with said drive shaft, and a clutch for connecting said driven shaft with the driven element of said coupling.

4. In a transmission, the combination of a drive shaft, a driven shaft, a hydrodynamic power transmitting device, two sets of reduction gearing, a clutch for completing a power train between said shafts including one of said gear sets connected with said drive shaft, a second clutch for completing a second power train between said shafts through said hydrodynamic device and the other gear set, a third clutch for connecting the driven element of said hydrodynamic device with said driven shaft, and a one-way clutch in said second power train adapted to overrun when said third clutch is engaged.

5. In a transmission, the combination of a drive shaft, a driven shaft, a fluid coupling, a low-speed set and a higher-speed set of reduction gearing each connected for driving said driven shaft, said low-speed gear set being connected with the driven element of said coupling, a clutch for connecting said higher-speed gear set with said drive shaft, a clutch for connecting said driven shaft with the driven element of said coupling, a clutch for connecting the driving element of said coupling with said drive shaft, and a one-way clutch in said low-speed gear set.

BENJAMIN A. SWENNES.